Sept. 5, 1967  D. RUBENSTEIN  3,340,115
METHOD OF MAKING A REINFORCED COMPOSITE CONCRETE PIPE
Original Filed Dec. 11, 1957  4 Sheets-Sheet 1

INVENTOR.
David Rubenstein

Sept. 5, 1967          D. RUBENSTEIN          3,340,115

METHOD OF MAKING A REINFORCED COMPOSITE CONCRETE PIPE

Original Filed Dec. 11, 1957          4 Sheets-Sheet 2

INVENTOR.

David Rubenstein

Sept. 5, 1967  D. RUBENSTEIN  3,340,115
METHOD OF MAKING A REINFORCED COMPOSITE CONCRETE PIPE
Original Filed Dec. 11, 1957  4 Sheets-Sheet 3
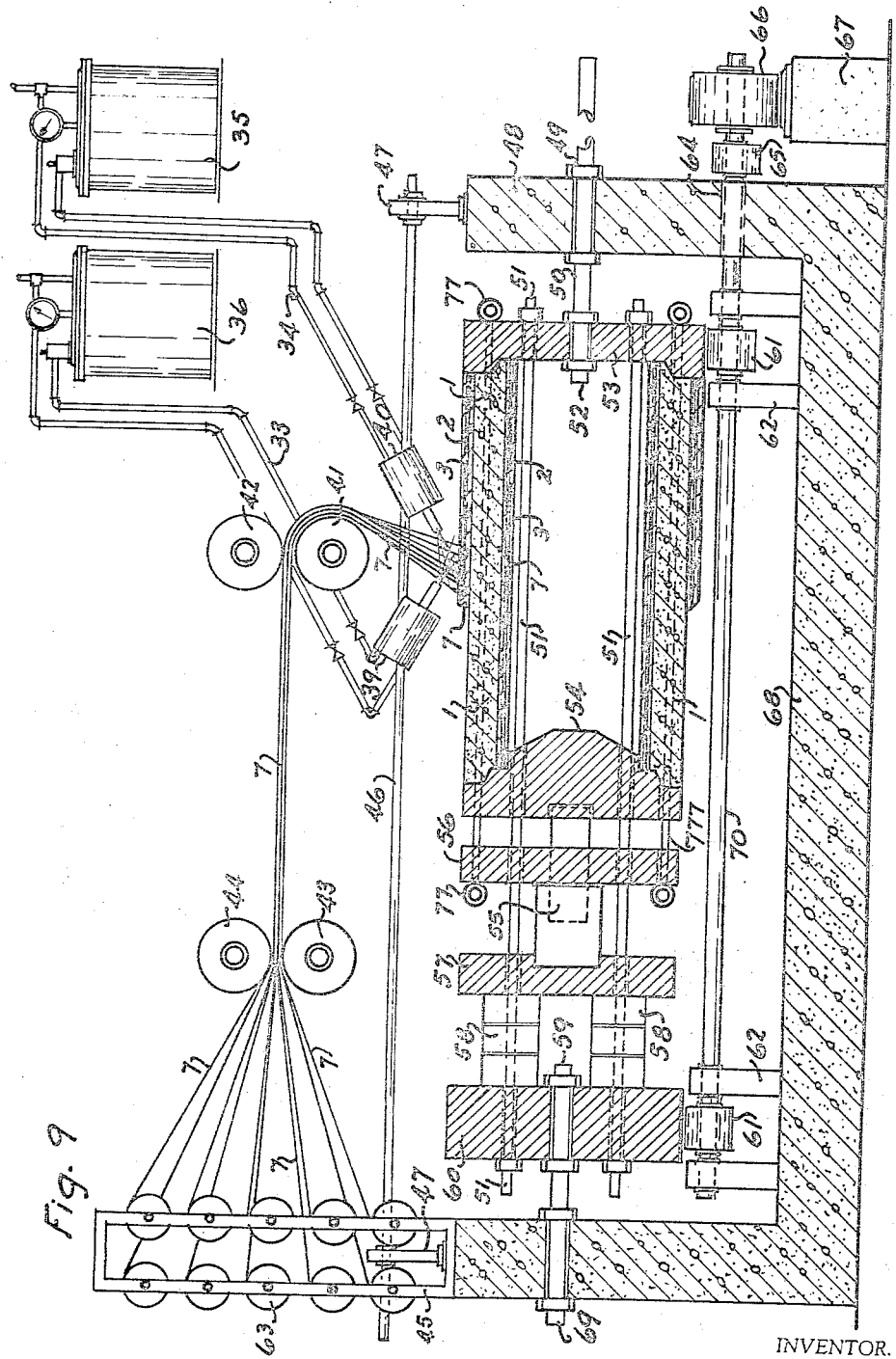

Sept. 5, 1967 D. RUBENSTEIN 3,340,115
METHOD OF MAKING A REINFORCED COMPOSITE CONCRETE PIPE
Original Filed Dec. 11, 1957 4 Sheets-Sheet 4
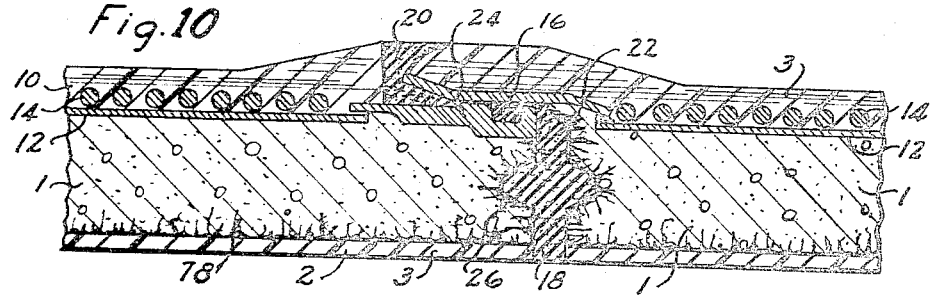
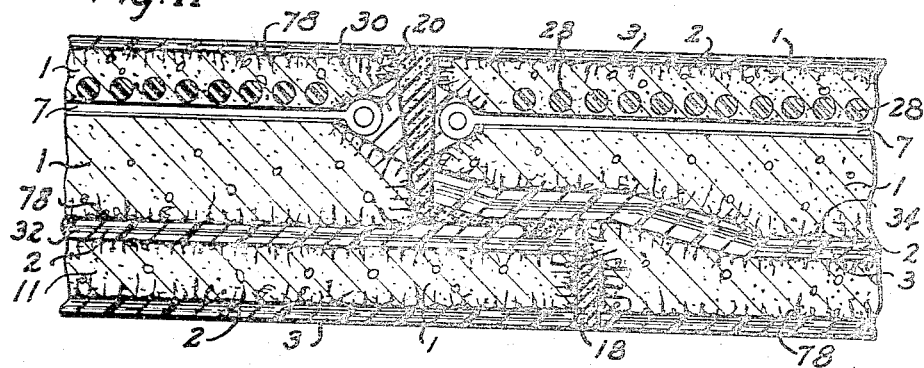
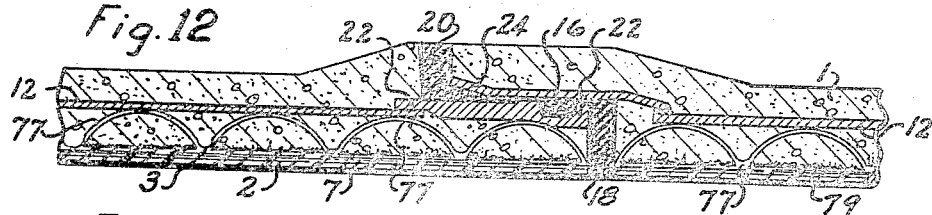
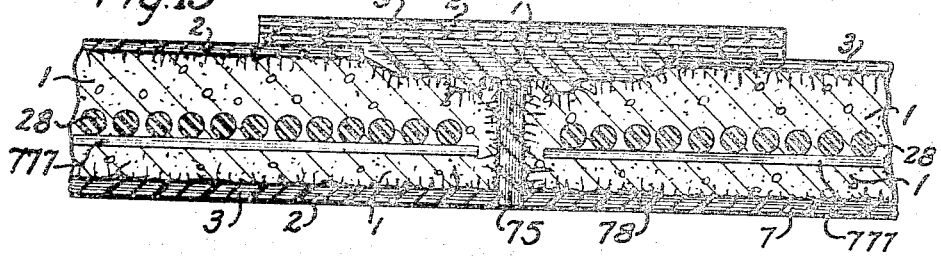
INVENTOR.
David Rubenstein United States Patent Office 3,340,115
Patented Sept. 5, 1967

3,340,115
METHOD OF MAKING A REINFORCED COMPOSITE CONCRETE PIPE
David Rubenstein, 2750 2nd Ave., San Diego, Calif. 92103
Original application Dec. 11, 1957, Ser. No. 702,050, now Patent No. 3,177,902, dated Apr. 13, 1965. Divided and this application Jan. 25, 1965, Ser. No. 427,861
25 Claims. (Cl. 156—86)

This is a division of application Ser. No. 702,050, filed Dec. 11, 1957, now U.S. Patent No. 3,177,902.

This invention relates to prestressed laminated pipe, tanks and vessels, and methods of making the same. An object of the invention is to provide prestressed reinforced concrete or other porous structural material pipe, tanks or vessels highly resistant to dynamic loads while at the same time sustaining designed-for loads.

An object is to provide interior and exterior surfaces material characteristics adapted to substantially protect the fluids or other materials flowing through or stored in the concrete pipe, tank or, vessel or the like.

An object of the invention is to provide means for making plastic resin-fiber reinforced prestressed reinforced concrete pipes, tanks and vessels.

An object of the invention is to improve existing constructions comprising pipes, tanks and/or vessels to make such constructions highly resistant to residual nuclear radiation that might follow the explosion of an atomic bomb.

An object is to reinforce the interior and exterior surfaces and materials adjacent said surfaces made out of porous structural materials, e.g., concrete or clay products, or other stone-like products and materials, so as to prevent or minimize "spalling" of the porous structural material.

A further object is to reduce the cost, improve the quality and improve the engineering and structural functionality of pipes, tanks and vessels.

This invention provides materials possessing great strength in tension, laminated with materials of relatively low tensile strength but possessing great compressive strength.

By virtue of this invention structural materials are provided suitable for normal and extraordinary loading with compression loads, shear loads, tension loads, and/or torsion loads, whether or not subject to temperature changes, impact, shock or other distorting tendency.

The invention also makes it possible to design pipes, tanks and vessels with properties and characteristics tailored to the particular requirements of use. It is thus possible to accentuate any desirable characteristic, such as resilience, moisture and fluid resistance, shockproofing, light weight, thermal insulation, or thermal conductivity, smoothness, load bearing capacities in compression, tension, shear and torsion. All these capacities and properties can be designed into the resulting structure and all factory produced. In addition, by my invention, pipes, tanks and vessels are easily designed to be fireproof or fire resisting, and especially can be made chemically resistant to many adverse chemical influences.

These and other objects will be apparent from the drawings and the following description thereof. Referring to the drawings, which are for illustrative purposes of embodiments of the invention;

FIGURE 9 is a view of an embodiment of the invention, prestressing apparatus for making it and spray-spinning materials and apparatus;

FIGURE 10 is a cross section of a portion of the wall of a prestressed cylinder pipe, tank or vessel;

FIGURE 11 is a cross section of a portion of the wall of a prestressed reinforced laminated concrete pipe, tank or vessel embodying the invention;

FIGURE 12 is a cross section of a portion of a looped reinforcement and wall of a portion of a prestressed laminated concrete pipe, tank or vessel;

FIGURE 13 is a cross section of a portion of the wall of a centrifugally spun pipe having a laminated joint.

Figure 1:
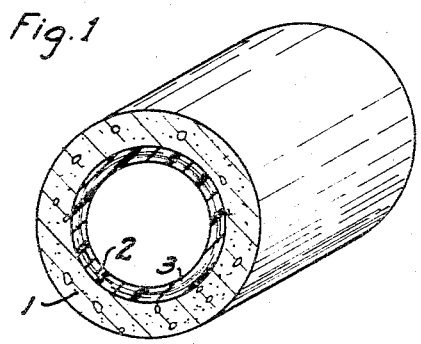
FIGURE 1 is an isometric view of a circular concrete body having a plastic resin laminated interior construction of the invention.

In my prior applications, I have disclosed and claimed high strength structural elements and the method of making them in which concrete bodies or other porous structural material is provided with a high tensile strength surface layer integrally bonded in, on and to the concrete or porous structural material, and, specifically I have disclosed the use of plastic compositions and plastic resin compositions reinforced with fiber glass or other high tensile fiber in woven or unwoven mat form, fabric, strands, slivers, cables, tapes, roving, etc.

The present invention provides circular closed or partially closed constructions like pipe, tanks and vessels of porous structural material having greatly improved strength features and surface construction layers resistant to impact, abrasion, erosion, chemicals, etc. These prestressed preloaded constructions employ prestressed preloads derived from forces generated in and of chemical reactions used alone or together with mechanically and/or thermally derived force systems.

Preformed porous structural materials, e.g., concrete of any desired type of mixture and strength provide compressionally strong material and is used as a set and cured and "pre-shrunk" component. Plastic resins, e.g., catalyst-activated, cross-linked polymers of synthetic resins combined with modifying agents of inert fillers, extenders and/or pigments, elastomeric materials and rubbers of the type disclosed and claimed herein provide the plastic resin reinforcement, binders and adhesive components. Such plastic resins may be polymerized as 100% solids in homogenous films as layers made in a single application, so-called "one-pass" application or can be made in multiple applications either placed at one time in sequence or at spaced apart times for convenient processing. Fibers of fiber glass, the preferred fiber of the present invention, but not limited thereto, or natural fibers like hemp, cotton, sisal, etc., or synthetic fibers like nylon, polyethylene terephthalate, (Dacron), acrylic fibers, (Orlon) or Dynel, etc., and/or fuzed quartz, aluminum-silicate, (Fibrefrax), ceramic spun fibers, etc., with fibers of both organic and inorganic fibrous materials being used together in any combination, or used alone, to provide the non-metallic reinforcement and/or filler that I use as components of reinforcement. Prestressing type steel wire, cable or rod reinforcement is used alone or in some constructions in combinations with plastic resin and/or elastomeric compositions and with or without fibrous reinforcements.

It is known that concrete shrinks on curing. This shrinkage is variable and is generally considered to extend over a long time, with the greatest amount of shrinkage occurring in about 28 days of curing under moist curing conditions at normal temperatures, e.g., 72° F. It is known how to vary this time period of complex chemical reaction occurring in the setting of concrete but substantially all concrete shrinks.

Concrete does not follow Hook's Law within the elastic limits of the concrete, there being a certain amount of "plastic flow" under load. Identical deformation under load is followed by a slow secondary deformation due to the applied load. In a concrete construction that is deformed a fixed amount by applied load, the strain necessary to maintain the deformation gradually decreases in amount to a lesser substantially constant amount of strain resulting in a permanent internal stress of the concrete.

In prestressing concrete by means of winding wire or cables under tension about the concrete pipes, the wire is covered with concrete and cured about the wire. This results in adverse features of shrinkage of curing having to be taken into account and from said shrinkage allowance made for the loss of prestressed preload in the wire.

I have found that a "pre-shrunk" concrete, etc., i.e., a concrete or other porous structural material component substantially reduced shrinkage and plastic flow problems. Particularly, this is so in the impregnated and permeated porous structural materials having the resinous compositions comprising substantial portions of its integrated composition. I have found that thinner shells or walls can be used because of the higher strength composite materials of concrete and resin. In this specification the word concrete includes by definition any useful porous structural material made with Portland cement or, e.g., made with resinous binders in place of Portland cement. Also the composite materials provide a concrete, etc., structure adapted to use in places where concrete or similar porous structural materials fail, e.g., for various reasons, e.g., acid soil or salt water or ground water corrosion borne materials. Pipe and vessels as used in chemical processing are more easily made by my invention and are chemically resistant and less costly to make.

To overcome the inherent structural limitations that coating on a surface of a porous structural material causes by the failure of bond at the adhesive interface by reason of impact or adverse loading, I make a surface construction layer having very substantially constructed anchorages into and of the porous structural material, which e.g., may be a concrete material comprising the compression material component of the embodiment of the invention, with a resin, or resinous or elastomeric composition placed on and into the body of said porous structural material, provides, when set in said body, a resin or elastomeric or resinous solid having a predetermined amount of shrinkage. I have found that a provided balanced design is had in the surface construction layer.

This shrinkage provides stressing means which utilizes the substantial and large forces resulting from the chemical reactions of e.g., the polymerization of thermosetting resins and the like, as well as the expansion forces of the materials of the laminate, whereby the plastic resins, resinous substances, resin-elastomeric substances and elastomeric substance and/or rubbers congeal, set, fix and shrink-fit into place. The forces so generated at the same time prestress the materials of the surface construction layer and its adjacent body of porous structural material, e.g., concrete, which the plastic resins or resinous or elastomeric compositions inclose and bond together as well as prestress the concrete bodies to which the laminations comprising the surface construction layers are applied and on the completion of said chemical reaction, e.g., polymerization, integrates the combination into a unitary structure, e.g., a pipe section, a tank or a vessel.

This invention provides prestressing of preloads into concrete bodies by the shrinkage forces provided by shrinking, condensing, tightening action which introduces said prestressed preloads into the porous structural material, e.g., concrete, as the materials of the surface construction layer lamination undergo setting, cooling, solidification, chemical reaction, shrinking, condensing and unification with the preformed, pre-shrunk porous structural body, e.g., concrete pipe section.

This can be likened to the same thing as occurs to a wooden wheel when a blacksmith "sweats-on" a steel or iron rim and the wheel becomes tightened as the wood of the wheel takes up the prestress stresses introduced by the shrinking of the cooling iron or steel.

The transfer of stress into the precast concrete component is accomplished by contact of the plastic resins, e.g., unsaturated polyester resins, or other resins that fill porous holes and interstices connected therewith and by the general porosity of the concrete, and on bonding together with the plastic resins, fiber glass, or other fibers or reinforcements, fillers, steel wire or cable reinforcements with the concrete. The shrinkage stresses of the plastic resins, e.g., unsaturated polyester resin compositions, and other components that come about by heating and cooling, setting or fixing and/or chemical reactions thus introduce prestress forces into the concrete pipe constructions and structural components thereof, preloaded for ultimate use, and thus makes them stronger, resilient, flexible and better suited to end uses.

The stressing means includes features and novel means which utilizes the substantial and large forces resulting from chemical reactions of polymerization of thermosetting resins and the like, and the expansion forces of the materials of the laminate, whereby the plastic resins congeal, set, fix and shrink-fit into place. The forces so generated at the same time prestress the materials of the laminate which the plastic resins inclose and bond together as well as prestress the concrete bodies to which the laminations are applied and integrates the combination into unitary structures and members as completed pipe sections and lengths. The prestressing forces resulting from the chemical changes are measurable by the known shrinkage of the plastic resins or plastics used.

In combination with thermal pre-compression or tension forces, or forces generated in-situ, the chemical forces provide means alone or in combination with thermal and mechanical prestressing to provide prestressed preload in and of and with the materials of the composite structure making up the prestressed constructions, e.g., pipe, tank or vessel. The stresses of shrinkage resulting from such a reaction as chemically induced as, e.g., a polymerization reaction, said reaction chemically induced as, e.g., said reaction occurring in the setting of, e.g., an unsaturated polyester resin composition, are transmitted as the complex stresses of shrinkage in the plastic composition through the interface bond area of the laminated structure or construction of pipe, tank or vessel as compressive stress in the surface of the bonded materials and the area adjacent the surface of the bonded materials.

FIGURES 1–13 illustrate various constructions of pipe, tanks or vessels which are coated, laminated and integrated on their surfaces and in their body structures with plastic resin bonded fibrous reinforcements, e.g., fiber glass, which compositions may also contain other fillers, bonding agents, binders or reinforcements in addition to or instead of the fibrous materials, e.g., fiber glass fibers. Pipe, or tanks, or vessels as is shown in the figures are made and advantageously used for water conduits, aqueducts, sewers, sewer manholes, sewage processing constructions, fluid transmission lines in industry, commerce and military operations, and irrigation systems. A typical embodiment comprises a concrete body shown in section in FIGURES 1–13. Such constructions have an inner layer composed of fiber glass resin compositions (or other strong fiber or reinforcing strands) embedded and bonded by plastic resin compositions, advantageously polymeric resin compositions such as unsaturated polyester resin compositions, epoxy resin compositions or polyurethane resin compositions, or compatible resinous compositions of two or more resins, elastomers or synthetic substances. The flowable characteristics, and in general, placement features in the processing of such materials when made into formulated compositions of my invention together with end product features and characteristics of strength, durability, chemical resistance, load bearing characteristics and features, etc., determine the specific formulated compositions I employ. The materials are worked and handled and processed for the best use of their structural and civil engineering features applied and used in the light of and knowledge of the art of chemical engineering. The composite structure, e.g., a large conduit of prestressed concrete is designed for specific end use and to meet specific end conditions of use in the full and broad sense of engineering design. The novel features of surface layer construction and the strength and load bearing characteristics of such pipe are greatly increased by the laminated construction, the concrete being excellent for resisting compressive strains, the fiber glass plastic resin composition affording high resistance to tensile stresses and adding substantially to the compressive strength of the composite pipe as well as having high strengths in shear, torsion and compression in its use as a composite composed material.

Pipes thus made have improved K factor, C factor, or other designation depending upon the flow formula used to express the coefficient of smoothness. In embodiments of my invention the surfaces are extremely smooth and uniform, and as a consequence such pipe will deliver, e.g., 15 to 20% more water (or other fluid). Because friction loss is reduced to a minimum, turbulence and joint obstructions to flow are practically eliminated. This increase in efficiency permits economies by use of smaller pipe sizes. Resin bonded joints solve many problems, leakage and entrance of roots or other growths into pipes through joints being restricted or eliminated.

By way of a simple example, the strength of such an untreated raw concrete pipe, e.g., as tested by an A.S.T.M. accredited testing laboratory, showed crushing strength of 1350–1400 lbs. per lineal inch of pipe. When this same pipe had fiber glass-resin composition comprised of 2 oz. fiberglass mat bonded, integrated and laminated in, on and to the inside and outside surfaces of said concrete pipe with an unsaturated polyester resin composition which was cured and set to make the construction a unitary product, the same tests with loading applied on a standard three point bearing showed 500 lbs. per lineal inch of pipe sustained before breaking, i.e., five times that of untreated pipe. Sufficient strength is thus developed to eliminate need for steel reinforcement. This test was stopped at the loading of 500 lbs. per inch and the sample remained intact, with the only evidence of impending failure a slight cracking of the concrete body barely discernible to the eye, and with no discernible failure in either the inner or the outer plastic resin composition fiber glass reinforced surface construction layers.

When such pipe is used in corrosive soils or for transmission of corrosive liquids, the plastic resin fiber glass construction protects the concrete and there is no danger of failure due to corrosion of reinforcing rods, etc.

For various purposes where temperature or processing is desired, tubular or other shaped circulating lines can be contained within the body of the side wall of a pipe construction. Thus, cooling liquids or processing fluids can be re-circulated in and around the pipe inside its body wall.

Some embodiments of the present invention can be driven as piling or as well casing, and in such circumstances of use, its high strength stranded reinforcing construction stands in good stead.

The plastic-resin-fiber-glass reinforced surface construction layers integrated and bonded to the porous structural material, e.g., concrete pipe body, can be made resilient and resistive, pliable and yet strong and able to take without failure greater strains and stresses, in tension, compression, shear and torsion, e.g., as imposed by earth loads or other designed loads, with a margin of safety for withstanding earthquakes, bombing and the like. In all cases concrete or other porous structural material, protects plastic resin surface layer constructions from heat and abrasion, and notch and scratch effects are avoided. The plastic resin composition protects the concrete, or the like and strengthens it.

If desired, a thin cylindrical steel core, or a plastic-resin-fiber-glass laminated core may be used within the pipe upon which wire, or fiber glass strands embedded in a plastic resin composition suitable for prestressing is wound or spun on said core. Also this may be embedded in a suitable layer of concrete which is then cured and dried and the plastic resin composition, such as a polyester resin, e.g., an unsaturated polyester resin composition may be then applied by spraying, embedding, layering, painting, dipping or other method, including "spray-spinning," and into this layer of plastic resin and discrete binding components, fiber glass or other fiber, e.g., sisal, hemp, cotton, nylon, rayon, polyethylene terephthalate (Dacron), acrylic fibers (Orlon), or other acrylic fibers of various kinds, synthetic fibers, etc., can be applied, and will bond and unite with the pipe body, this providing added strength as above described, and fluid-tight sealing of the surface obtained.

On a polished stainless steel core or mandrel, or aluminum core with highly polished surface, or other mandrel covered with cellophane, or other kind of film or sheet, a coat of polyester resin (or other selected resin) with or without filler, for example, and, can be spray-spun by revolving the mandrel beside a handily mounted spray gun on a sliding or geared support so that the sprayer travels up and down the length of the mandrel so that an even amount coat of resin plastic composition is deposited on the mandrel. On another sliding or geared support fiber glass films, mats, cloths, unidirectional fibers, flock, multi-directional fibers, rods, cords, cables, roving, tapes etc., advantageously of fiber glass, are carried and fed onto the mandrel as it is coated with the plastic composition so as to reinforce by its incorporation into the body of the plastic resin composition. Thus a fiber-resin layer is built up on the mandrel to a desired thickness for required strength and is securely made into a homogeneous cross-section of the fiber-reinforced-plastic-resin composition.

By using a heated mandrel, the plastic-resin-composition can be immediately cured at the desired speeds, or air-setting plastic resins may be used which cure up on the mandrel without heat. On withdrawing the mandrel, or on removing the product made, and on removing the cellophane or equivalent liner from the inside surface of the pipe, the pipe will be found to have an exceptionally smooth and almost perfect surface, the coefficient of smoothness being 15% to 20% better than existing pipes.

It is important to note that the fiber glass in this liner is fully protected by the plastic resin composition against leaching and abrasion from substances carried in the fluids which may pass through the pipe. To assure such protection, the fiber glass or in fact any other fiber used, before it is applied on the mandrel or as it is applied on the mandrel, is thoroughly coated with the resin composition, e.g., by the spray gun or e.g., by being processed through an impregnating apparatus. For this purpose the second mandrel from which the fibrous material is spun or unrolled, is co-ordinated with the spray gun for the resin so that the fibers are well coated and shielded as they come to rest on the mandrel and are further coated by spraying the plastic resin composition thereon until the desired thickness is reached and achieved. The resulting reinforced plastic-resin-composition-fiber pipe or pipe liner may be finally united with the preformed and cured concrete or other porous structural material pipe body. This may be facilitated by impregnating and coating the concrete with a bonding-type resin or resin composition such as an unsaturated polyester resin, or modified-polyester resin as known in the art, the surfaces of which are then prepared for the fiber-resin composition lamination by properly sanding or grinding, or by treatment with a chemical, e.g., acid washing, which assures an integral bonding of the lamination to the surface construction layer or coating that is bonded thereto.

In FIGURE 12 is shown another method of anchoring the fiber-resin-composition-surface-construction-layer to the porous structural material, e.g., concrete. In this case the fiber glass or other fiber reinforced resin facing is extended in a series of loops, i.e., cable-like loops 77, in which the fiber is protected by shielding with the plastic resin composition, as hereinabove mentioned, and these loops project into the concrete body to give anchorage for the facing. With this method of manufacture, the facing may be preformed with these loops and the concrete applied as a coating, e.g., by the "spray-gun" method or by casting in suitable forms. Also the concrete may be a non-cementitious type of sand alone or sand and aggregates having a polymeric resin binder in place of Portland cement.

A series of sections of concrete pipe may be joined into a long pipe line or conduit of high strength by means of the fiber-resin facing formed in-situ, i.e., by spray-spinning, or other means, with effect somewhat similar to that described in connection with the joining of concrete block or other structural elements of my invention disclosed and claimed in my copending applications. These constructions have high tensile strength plastic resin fiber reinforced surface construction layers and are unitary structures. Such constructions have high resistance to shock and therefore advantageous for use in areas where earthquakes or bomb shock may be encountered, or wherever a rigid construction is required, but one which can accommodate substantial resilient flexure with no impairment to the units or the joints.

A further improvement can be accomplished by incorporating in the concrete a quantity of polymerizable plastic material, either air-setting, or chemical setting, or thermosetting. When the concrete mixture has been poured and set, the plastic-resin effects a reinforcement of the concrete. Before the resin in the concrete is fully cured, it may be softened or melted by heating or chemically combined, i.e., the resin, and thereby improve bond with the concrete or with the facing or reinforcing material at the surface of the concrete.

There are many types of resin fabrics which can be used with my invention, among which particularly may be mentioned the polyester resins, silicone resins, synthetic rubbers and natural rubbers, epoxy resins, polysulfide rubber resins, polyamine resins, polyurethane resins, each of which may be used alone or in combination with other plastic resins. Binders of many different qualities are available, and in the application of the present invention one may choose among others already available and those which may hereinafter be developed to meet particular requirements of any application of the present invention.

It is to be understood, also, that the present invention is not limited to the use of any particular concrete aggregates or to organic or inorganic aggregates alone. Fillers, including cotton, wool, sisal, hemp, nylon, paper, cotton seed hulls, straw, grasses, wood, bamboo, and/or many other materials known to the art can be used in the practice of my invention.

Although in most cases considerations of cost and structural properties will lead to the use of Portland cement concrete, a variety of features and characteristics are obtainable by varying the choice of aggregates, cements, plastic resin binders, fillers, fibers, metals, etc., and the concrete can be made, if desired, without using Portland cement by use of cements other than Portland cement, and even by use of plastic-resins as the binding and cementing material of the and for the aggregate. Laboratory tests show good structural characteristics for concrete made in this manner. Where time is of the essence and one cannot wait for Portland cement concrete to set and cure to its required strength, the use of plastic resin composition or elastomeric composition can be used and in the matter of minutes e.g., 5 minutes to 10 minutes as the aggregate binder sets and cures in such times, strengths are obtained equal to and generally greater than many Portland cement concretes at their 28 day cure.

In some cases the concrete may be omitted entirely and, for example, expanded plastics or other lightweight materials may be sandwiched between the high tensile plastic facings according to the present invention, which afford surface strength and shock resisting qualities.

For tanks, vessels and the like, the use of fiber glass mats, cloths, cables, ropes, roving, etc., around and/or within the concrete body is advantageously used for prestressing. This can be accomplished effectively, quickly and inexpensively because it is possible to spray the plastic resin binders under appropriate pressure that will firmly fix the fiber glass or other reinforcing materials and at the same time insulate and shield the fibers from the concrete or other porous structural material so that the prestressing member can be kept free from the deleterious effects of direct incorporation in the concrete.

FIGURES 1–13 inclusive, show shapes and constructions which are only illustrative and almost any conceivable shape that is required in industry, military or civilian use can be made according to this invention.

Any increase in the coefficients of smoothness with improvement in the carrying capacity or reduction in friction losses in concrete pipe lines is justified even at an increase if any, in cost because the use factor of concrete pipe lines distributes such cost over many years in use. 100 years is not too much to expect from a well engineered concrete pipe line structure.

The improvement in surface provided by this invention wherein concrete pipe is evaluated for its coefficient of smoothness and then compared to the products of this invention, by test shows the surface of an embodiment of this invention to have 25% greater flow. The smoothness coefficient of e.g., stainless steel or cellophane is the criteria I use for smoothness coefficient because my invented pipe line surfaces or tanks or vessels are cast, laminated and made against such surfaces. For equivalent flow in this design of pipe I can use 25% less pipe just on the improvement made on smoothness.

From the above disclosure and that hereinafter given, and particularly from the features applicable to the present invention from my copending applications and patents of issue, it can be seen that substantial benefits and improvements are made in the flow characteristics, strength, impact resistance and chemical and environmental resistances to structures like pipes, tanks and vessels. Chemical prestressing of the porous structural material greatly enhances the strength and utility of the structures. Fibrous reinforcement e.g., glass fiber strands or roving has been tested at ultimate strengths of 300,000 to 5,000,000 p.s.i. in tension having a 3% to 3½% elongation with recovery before failure under ultimate load. Commercial fiber glass fibers in laminates already tested show strengths of 50,000 p.s.i. to 100,000 p.s.i. in flexural loading.

Referring to FIGURES 1–13 showing embodiments of my invention;

FIGURE 1 illustrates a round conduit, pipe or hollow cylinder or column and is laminated and covered on the inside surface thereof with a plastic resin composition which may or may not have a filler therefor and bonded fiber glass fiber and/or other fillers, binders or reinforcements designed to meet usual or special structural design requirements. Such requirements may be e.g., pipe for water conduits or aqueducts, irrigation lines, sewers, fluid transmission lines in industry and commerce, military pipe uses, civilian or military residential piping, etc.

In the drawing of FIGURE 1 is illustrated the concrete 1, the glass fiber 2 and/or other selected fiber or reinforcement, and the plastic resin composition 3, e.g., polyester resin composition, or e.g., epoxy resin composition, or even a compatible mixture of epoxy-polyester resin composition, or other adaptable resinous compositions. The strength and load bearing characteristics of such a pipe come from the laminated constructions, the concrete being excellent in resistance to compression stress and the plastic resin composition glass fiber reinforcement being preferred but not limited thereto for the tensile stress reinforcement.

Figure 2:
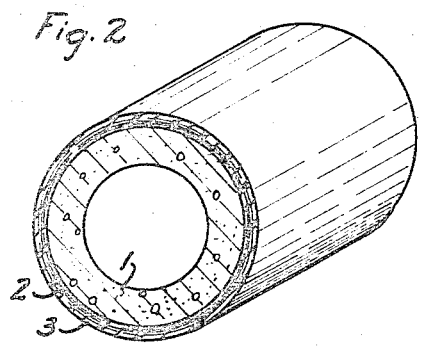
FIGURE 2 is an isometric view of a circular concrete body having a plastic resin laminated exterior construction of the invention.

FIGURE 2 shows an embodiment wherein the exterior surface of a concrete pipe line is covered, laminated and reinforced with a plastic resin fibrous reinforcement with concrete or other porous structural material 1, fiber glass fibers 2 and plastic resin composition 3 being integrated and combined into a unitary construction.

Figure 3:
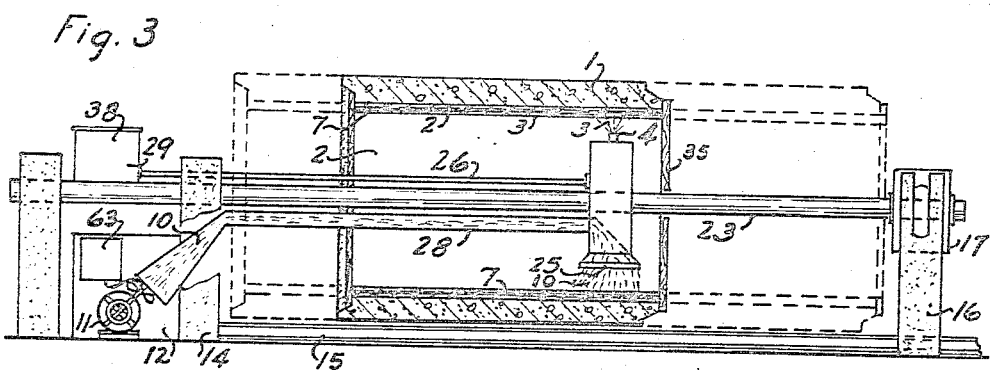
FIGURE 3 is a view of a spray-spinning machine and apparatus adapted for the manufacture of embodiments of the invention.
Figure 4:
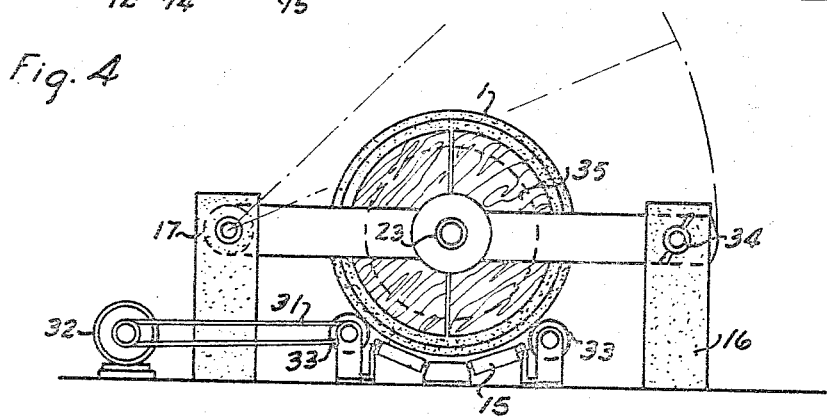
FIGURE 4 is an end view of FIGURE 3.
Figure 5:
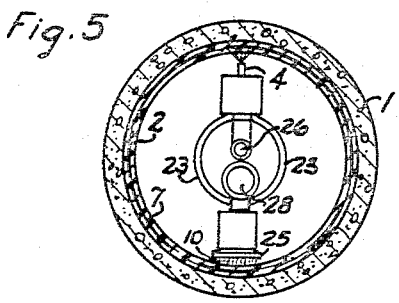
FIGURE 5 is a sectional view of an embodiment of the invention and showing apparatus adapted to making it.

FIGURES 3, 4, and 5 show apparatus for providing laminated concrete pipe constructions adapted to providing many different embodiments of the invention.

In this invention concrete pipe 1 is provided as a cured and dried precast concrete pipe element. In many resin systems, but not all systems it is essential to remove the water from the pores of the concrete to insure designed bonding, permeation and penetration of resin substances and compositions into the body of the concrete or the like. Fiber glass fiber 2 is provided as roving 63 which is fed into a roving cutter 11 and blown by air which I may heat or may not heat depending upon the resin setting characteristics of the composition I use in any particular formulation.

The chopped fibers are cut to any desired length, e.g., about 2″ length and are varied in length for specific designs. The chopped fibers are blown into the duct 28 and out through distributor head 25 from which the fiber glass fibers are deposited and applied on the plastic resin composition 3 as same is applied on the concrete 1 from spray head 4. As the fibers lay on the resin composition they are covered and built up into a mat of any desired thickness making a resin-fiber fabric lamination to and with the concrete. Pressure is provided by air to drive the spray head and fiber distributor head and can be adjusted to various resin-fiber mixtures. The resin composition is supplied from supply tank 38 by pump 29 not shown, but in the apparatus, through pipe 26 to distributor spray head 4. The plastic resin composition 3 and fiber glass fibers 2 feeding apparatus is mounted on support shaft 23.

A concrete pipe element 1 is placed on conveyor 15 so it can be spun by drive rolls 33 one of which (or both) are driven by belt 31 which is driven by motor 32.

A bearing 23 supported on a bar 17 is adapted to being raised so pipe element 1 can be placed between the spinning abutments 14 and 16 and is locked in place with member 34.

The concrete pipe element 1 is closed at its ends with temporary closures 35 which are made of wood or metal or other material and the pipe element caused to spin at a selected speed while at the same time the fiber glass fibers 2 and the plastic resin composition 3 are "spray-spun" onto the inside surface of the pipe to a predetermined thickness and into a unitary bonded surface construction layer.

At times I first spray a resin composition layer on the concrete and get a desired penetration and permeation before I laminate the fibers 2 into the resin composition layer. The pipe element 1 is caused to move back and forth on the conveyor by means not shown, or manually, to provide an even layer of laminated construction on the inside of the pipe element 1.

At other times I use one of my prepared enveloped constructions having elongated strands 7 of fibrous material, e.g., fiber glass unidirectional fiber located and spaced for a given designed construction. I lay this prepared laminated enveloped construction in a sticky bonding layer of plastic resin composition 3 which I have previously placed.

Another embodiment is made by placing a mat of dry fibers on a layer of sticky bonding resin composition and the pipe element 1 rotated at a slow speed until the resin composition comes through the mat and the sticky resin thus saturates the mat. This in certain embodiments, but not all, may be allowed to partially set after which the speed is increased and additional resin composition and/or fibers are placed to complete the laminated construction. The centrifugal force generally drives the fibers down into the resin composition because the specific gravity of the glass fiber is greater than the resin composition when the resin composition is used with little or no filler therefor. By increasing the filler content, or by making the resin composition thixotropic, balanced design can be had so that the fiber layer, if it be a layer, can be supported between two layers of resin composition. In this way I make spun surfaces that are very smooth, about like glass, since in the process it is possible to orient the constituents of the composition to provide plastic resin surfaces of high gloss and smoothness.

When I want directional reinforcement 7 in the laminate I use elongated strands 7 in predetermined alignment and direction, e.g., longitudinally of the pipe element 1 or e.g., helically wound at a specific angle of placement.

Figure 6:
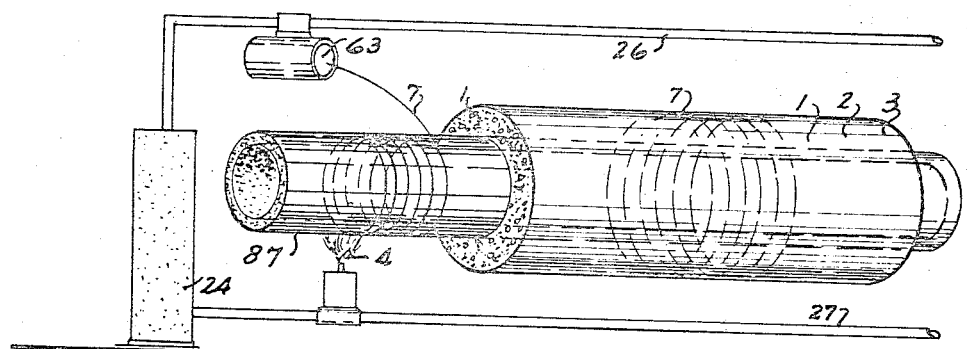
FIGURE 6 is a view of a spray-spinning apparatus adapted to make embodiments of the invention.

FIGURE 6 shows the placing of fibrous strands 7 on a e.g., stainless steel mandrel 87 having a highly polished surface. The plastic resin composition 3 is spray spun from spray head 4 as the mandrel rotates. The fiber 7 may be tensile fibers tensioned by apparatus shown in FIGURE 8 to a predetermined preload which I increase in specific designs by the shrinkage features of the plastic resin composition used in that specific design, e.g., an unsaturated polyester resin composition having a silica filler therefor. Concrete pipe element 1 can be made over the mandrel and comprises a non-cementitious concrete made of silica and resin composition bonded by heat or chemical reaction and be the porous concrete material of the pipe element 1. Also alternatively, the concrete pipe element 1 can be slipped over a prepared laminated construction layer which is a preferred manner in many uses but not all uses.

The exterior surface construction layer is placed by the same apparatus and thus a concrete pipe element 1 can be laminated inside and outside of its body surface to provide many different features of construction.

When pipe lines are to be exposed to chemicals in the earth or in use, e.g., oil field uses, or when salt water or corrosive fluids are carried, or under conditions found in chemical plants, etc., the exterior surface of pipe lines having e.g., a polyester-epoxy resin composition provides protection to the pipe line and its contents. Many other resins or resinous compounds, but not all, resins, rubbers, elastomers, or compatible combinations thereof are available in the art, and are becoming newly available almost daily in the rapidly developing technology of plastics for use in specific and designed constructions of this invention. No limitation is intended in the specific examples disclosed herein, the requirements being as disclosed. The tensile, compression, shear and torsion strengths of the plastic resins, etc., determine each particular use together with features inherent as found in the materials or as modified by me in my formulations govern the designed uses of the materials. A chemically engineered product is made providing a civil engineering solution to any specific structure made.

Figure 7:
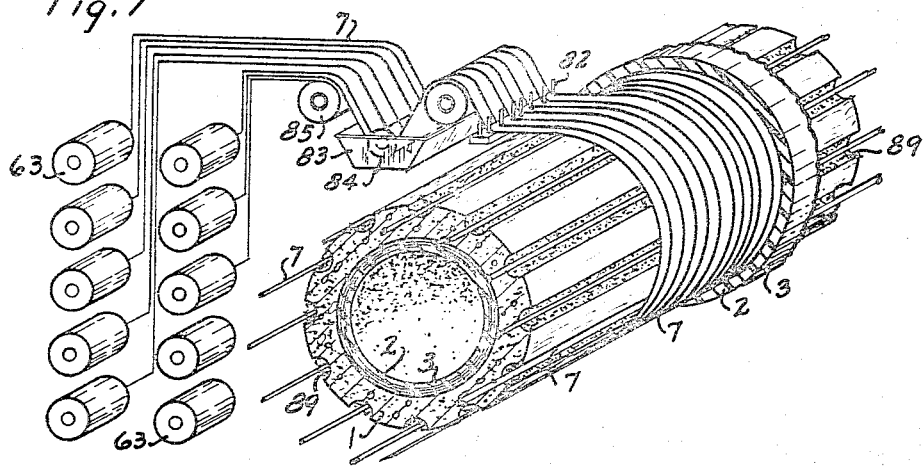
FIGURE 7 is a view of another means of making embodiments of the invention.
Figure 8:
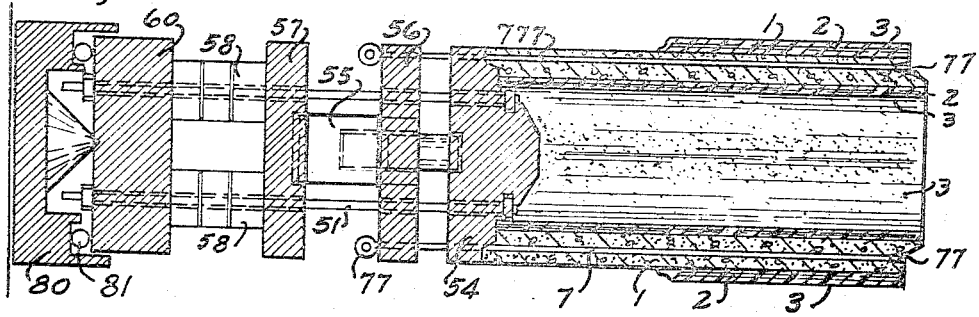
FIGURE 8 is a view of an embodiment of the invention and prestressing apparatus for making it.

FIGURES 7 and 8 show another embodiment wherein a porous structural element 1 is precast having grooves. Longitudinal cables or reinforcements 777 comprised of a plurality of strands 7 having end enlargements 77 are spaced in the grooves and end anchored by the enlargements 77 thereof. The opposite ends are placed in a pulling head 56 through a bearing head 54 against which hydraulic jack 55 supported by jacking head 57 against which said jack 55 exerts force and pulls cables 777 or other type reinforcements, e.g., steel bars or equivalents, into a desired tensioned prestress preload. The jacking head 57 is spaced from the rotatable end block 60 by spacers 58. Elements 54, 55, 56, 57, 58, and 60 comprise the prestressing apparatus when bolted together with bolts 51. The apparatus is adaptable for length and for placing any loading of prestressed preload desired within the range of the jack and the strength of the apparatus. The prestressing apparatus rotates on bearings 81 in a bearing groove of member 80. The apparatus can be used horizontally or vertically depending upon the handling devices at hand for handling the elements.

Roving 63 is mounted on several unwinding spindles and a predetermined number of strands 7 are pulled through a spacing device 82 after impregnation and being covered with plastic resin composition 3 in going through dipping vat 83. Guide roll 85 and hold down roll 84 help keep the fiber oriented.

After the cables 777 are tensioned to a desired preload I spin the element, e.g., a pipe section 1, in its hydraulic jacking apparatus and while under prestresed preload and wrap a predetermined number of helically wound strands 7 around the pipe element 1 and cover the grooves 89 and cables 777 with the resin composition carrying helically wound reinforcements. The layer is built up to a designed thickness and, if desired, an additional layer of plastic resin composition and a filler therefor is spray spun by means of the apparatus of FIGURE 7. The apparatus can be used for any convenient length, the prestressing cables 777 being made the length of the pipe, tank or conduit element 1 plus any additional length needed for anchorage and tensioning.

FIGURE 9 shows a complete plant equipment set-up for sprays, spinning and tensioning and compressing equipment.

A concrete base 68 is connected to two end supporting walls 48 through which bearing sleeves 49 hold bearings 69 in shafts 50 can spin. A jack bearing harness 53 is securely locked to shaft 50 by element 52.

A precast concrete pipe element 1 is placed against jacking bearing harness 53 and jack pressure harness 54 is placed against the opposite end of the precast pipe element 1. Jack 55 in its bearing harness 56 has tie rods 51 in it so that the tie rods 51 can be pushed through the pipe element 1 and locked in place against the outer face of jack bearing harness 53. By the tie rods 51 being placed the pipe element 1 is secured to the rest of the jack harness. Back-up harness element 57 is placed against the hydraulic jack 55 and spacer blocks 58 placed against element 57. The jacking apparatus is thus securely bolted against rotator bearing harness 60 by tightening bolts 51. Rotator bearing harness 60 has shaft 59 securely locked to its body and shaft 59 extends through end wall 48 through bearing end 69.

With the tie rods 51 hand tight bolted and connecting the several elements together the apparatus is now ready to induce a prestressed preload into the concrete material of pipe element (1) by force generated mechanically by the hydraulic jack element 55. By actuating jack 55 a predetermined selected amount of prestress preload is thus induced, i.e., puts the concrete material in compression preload.

When longitudinal cables 777 are used and the design calls for said cables to carry a mechanically induced prestressed preload, the cables 777 are inserted through the anchorages of elements 53 and 56 and the enlargements 77 of the cables 777 used as bearings whereby when the jack 55 is actuated to a predetermined selected tensile stress preload, then the desired prestressed preload is thus induced into the said cables 777.

With the pipe element 1 in a state of compression prestressed preload and the cables 777 in a state of tension prestressed preload the next step can be accomplished.

Motor 66 is started and speed control 65 set at a predetermined selected speed. Shaft 70 is rotated at this speed and spins drive pulleys 61 set in support bases 62. With the drive pulleys 61 turning elements 53 and 60 the entire spinning apparatus and presetressing jack device spins at a desired speed.

Strands of fiber 7 from roving coils 63 are fed through sizing rolls 43 and 44 and pulled through feed rolls 41 and 42 and secured to a desired place on the pipe element 1 just prior to starting the spinning motion of the pipe element 1.

Spray guns 39 and 40 used together or on occasion alone, are started and plastic resin composition 3 drawn from tanks 35 and 36. The spray guns 39 and 40 are mounted on a moving device, not shown, on shaft 46 so they can travel at a selected speed and cover the fiber strands 7 as they are being wound on the turning pipe element 1. By advancing the guns along the pipe element 1 an even layer of plastic resin composition 3 is placed and an even amount of fiber reinforcement 7 is embedded and covered. A surface construction layer of desired cross-section and having a desired selected amount of penetration and permeation of its plastic resin composition in, and on and bonded with the concrete pipe element 1 is thus formed.

The longitudinal cables 777 can be layed in the surface layer but I find that a grooved construction is preferred when cables have any significant diameter, e.g., above 1/4″, but not limited thereto. The cables 777 can be fiber glass strands or of roving, or of nylon strands, polyethylene terephthalate, acrylic fibers (Dynel or Orlon), metal, steel cable, rod or wire, or in fact any suitable tensile reinforcement. Cables 777 can be used without being prestressed but generally much saving in cost is had by prestressing, especially in long lengths. The prestressed preload induced into the concrete material as a compression load is captured and held permanently by the plastic resin composition when it converts from its fluid flowable state to its solid state. By balanced engineered design of components little or no loss of prestress due to plastic flow of the composite construction is had and constructions like concrete pipe elements usually worked in loadings where an extra tensile or flexural load could cause failure in e.g., the concrete component can by this invention be worked under more or less prestressed loading and always keeping the concrete in compression and having it not enter the tensile phase. The apparatus of FIGURE 9 can be of any desired size and no limitation is intended. Handling equipment and processing means are the criteria for size of elements processed and made.

The shrinkage forces of plastic resins e.g., unsaturated polyester resins induce prestressed preload into the composite construction as the resins set, fix, shrink and polymerize from a flowable material composition to a solid.

From the above disclosure a preferred method of making certain constructions is the method of making a prestressed reinforced hollow cylindrical construction adapted to support substantial interior pressures and external loading comprising the steps of providing at least one preformed cylindrical hollow body of porous structural material, placing said body under compressive load, said load being applied at its ends and longitudinally of said body, applying an initial layer of polymerizable resin composition which penetrates the surface to a discrete depth and permeates the body of said porous cylindrical body, applying a plurality of unidirectional strands of glass fiber under tension spaced substantially equidistant from each other on said body and spanning the said body longitudinally, and while applying additional resin composition, embedding said glass fibers in said resin composition, bonding and curing said resin composition and embedded glass fibers to a set plastic-resin-glass-fiber reinforced material and on completion of said curing, release said porous cylindrical body from compression making said prestressed reinforced hollow cylindrical body ready-for-use.

Thus is such a product made. The method of making a prestressed integrally laminated hollow cylindrical construction adapted to support substantial interior pressures and external loading comprising the steps of providing at least one preformed cylindrical hollow body of porous structural material, placing said body under compressive load, said load being applied at its ends and longitudinally of said body, applying an initial layer of polymerizable plastic resin composition which penetrates the surface to a selected discrete depth and permeates the structure of said porous cylindrical body adjacent thereto and in the neighborhood of the surface and leaves a surplus of resin composition on the exterior of said body, winding a plurality of helically disposed layers of glass fiber roving under tension over and in said surplus of resin composition on said body and while applying additional resin composition embedding said glass fiber roving in said resin composition, bonding and curing in, on and to said hollow cylindrical body said resin composition and glass fiber roving disposed therein to a set plastic resin-fiber glass reinforced integrally laminated prestressed hollow construction.

The method includes the method of making a prestressed reinforced integrally laminated hollow cylindrical construction as shown above in which in addition on said embedded plurality of unidirectional strands of glass fiber and while applying additional polymerizable resin composition, embedding and winding a plurality of helically disposed layers of fiber glass under tension over said surface of said plurality of resin embedded unidirectional strands of glass fiber and bonding and curing in, on and to said hollow cylindrical body the said resin composition and glass fiber strands and rovings to a set plastic resin-fiber glass reinforced prestressed integrally laminated hollow construction.

FIGURES 10–13 show embodiments of the invention adapted to high pressure pipe concrete conduits.

In FIGURE 10 concrete pipe element 1 is precast against a metal shell, e.g., steel cylinder 12 and has known end ring connections, e.g., a bell ring placed over a spigot ring which has a rubber gasket as disclosed in F. F. Jenkins Patent No. 2,348,477 issued May 9, 1944, or like that disclosed in L. G. Wilhelm Patent No. 2,407,009 issued May 10, 1949. The steel shell 12 is spirally wound with prestressing wire 14 in the known manner. Since the prestressed steel reinforcement in this example is near the surface it is usually covered with a layer of concrete. In areas of contaminating environment, e.g., acid soil, the steel reinforcement can be destroyed by acid action through the thin concrete shell covering. In area of earthquake or the like, vibratory forces tend to spall or crack the concrete and open the steel to attack and corrosion.

By means of this invention a "spray-spun" or otherwise applied laminated layer 10 of fibrous reinforcement 2 and resin composition 3 and having a resin filler therefor, e.g., silica powder or other protective fillers, e.g., an epoxy resin based lead filled thermosetting compound that provides a homogeneous laminated surface construction layer adapted for use as a radioactive shield or, other high density shielding compounds.

Such a compound can be a composition of about 90% to 95% lead by weight and have a density of from 5.5 to 6.7 grams per cc. By reason of the epoxy resin component the compound is stronger than pure lead and even without fibrous reinforcement has more structural rigidity than pure lead. Other known materials other than lead useful for such purposes can be used as filler, there being no limitation intended.

Polyethylene resin and lead can be used in a composition of about 90% to 95% lead by weight and 5% to 10% by weight of polyethylene (hydrocarbon polyethylene) which has a specific gravity of about 6.5 to 7.0 grams per cc. The polyethylene lead binder does not contain nitrogen or oxygene and consists essentially of molecules of $C_2H_6$.

The polyethylene containing lead is melted at about 210° to 230° F. into a low viscosity fluid. At the melting point temperature and up to 300° F. the fluid is of such a nature that fibrous reinforcement pulled through a dipping vat and wrapped around a concrete pipe element or block as in FIGURE 10 can be laminated into a layer of discrete thickness when I do the operation in a controlled environment. By keeping the epoxy-lead composition fluid it is easily worked.

Other resins and substances can be likewise used and the art of resins contains materials adapted to the present invention.

The two examples provide a smooth finish and high chemical inertness to acids, alkalies and other corrosive influences and provide materials adapted for use as a shield for nuclear applications. The high content of lead aids in shielding against beta and gamma rays. The hydrogen content in the polyethylene aids in shielding against neutrons. The formulations are infinitely variable even in the present state of the art.

Joint 18 can be a preformed element which is of a packaged ready-for-use construction (or it can be made in place). It can be poured-in-place and of material like that of 10. Joint 20 is advantageously made of epoxy-lead or polyethylene-lead composition and poured in the field on the installation of the pipe element. Shoulder 22 aids in holding joint 18 in place. Groove 26 can be a shape and size to receive joinery element 18 for a secure fit thereof. The inside of the pipe element 1 is advantageously laminated with a surface construction layer comprising plastic resin composition 3, fibrous embedded reinforcement 2, e.g., Fibrafrax, an aluminum silicate fiber, fiber glass fiber or a high temperature ceramic fiber, laminated and bonded to pipe element 1 by fingers of resin and anchorages of plastic resin composition 78 in the body of the pipe element 1.

Such a construction is designed to provide protection for potable water supply mains, and conduits or the like, against residual radiation fallout which can be brought into water supply systems through the concrete walls of the conduit systems, i.e., of the present concept of construction.

FIGURE 11 is another embodiment wherein all reinforcement is non-metallic being provided by glass fiber or other strands and fibers. A concrete element 1 is precast with longitudinal holes or slots in which to place cables 7. A helically spun fibrous reinforcement 28 is spun around the cables 7 and pipe element 1 and additional concrete 1 or "resin-crete" or "elastomer-crete" of my invention is cast around the outer face. When this is cured and set a surface layer construction lamination of plastic resin composition 3, fibrous reinforcement 2 and/or 7, and a surplus of resin composition over that needed to impregnate the fibers is bonded into, on and of the concrete body of 1 as shown permeated into the body at 78.

On the inside face of pipe element 1 laminated layers 32 and 34 are provided bonded to a porous structural material 1 which has an inner lining surface construction layer of plastic resin composition 3, fibrous reinforcement 2 bonded to the said porous structural material 11, e.g., lightweight concrete or e.g., high density concrete by "fingers" of resin composition 78. The cables 7 are secured by high strength resin composition 30 at the end anchorages. Joints and joinery 18 and 20 can be laminated preformed joinery of my invention or can be poured in place resinous or plastic compounds adapted to specific needs and uses. A balanced designed construction is made from the various elements and the preferred construction is adapted to resistance to high dynamic loads as well as resistance to chemicals or radiative agencies. The resiliency of structure is of primary importance and I prefer embodiments being tough and rubbery and resilient rather than brittle and hard. The original high compression values of the concrete or other porous structural material are increased substantially and the concrete properties in tension, shear and torsion are materially improved, and in a designed structural engineering manner.

FIGURE 12 shows a preformed laminated construction layer having fibrous looped cables reinforcement 7 a part thereof and extending in looped fashion into the porous structure of the lamination. In this embodiment the preformed laminated construction is provided packaged ready-for-use-bonding and a concrete body cast around it and cured before the next step. A steel shell 12 may be used and an outer concrete shell may be used, or any of the features of FIGURES 21 and 22 may be combined in any specific construction.

FIGURE 13 shows a typical centrifugally cast concrete pressure pipe embodying features of the invention. Reinforcement 777 and 28 is first assembled into a "cage" and then the concrete is spun around it as in the Hume Process and cured. I have found that for certain concrete mixes a period of 3 to 7 days under moist curing is what is required followed by 21 days of air curing. The knowledge of the art is relied on as concrete mixes vary, environment varies and no general rule is acceptable. A.S.T.M. Laboratory approved tests are the only safe criteria safe to use. Other cemented mixes other than Portland cement can be used, even plastic resin, and these are cured and made ready for laminating by following the knowledge of the art of compounding as is known or as is disclosed in my invention. Whatever aggregates are bound in a concrete, or a concrete-like-porous-structural-material, are cured and made ready in accordance with an engineered structural engineering materials design of desired strength and use properties.

When cured, the concrete pipe element 1 is laminated by the methods herein disclosed, i.e., on its inner and outer faces with a surface construction layer, e.g., an advantageously used layer of polyester resin composition, or e.g., polyester-epoxy resin composition, or e.g., an unsaturated polyester containing monomeric methyl methacrylate blended with 10% to 25% monomeric styrene or vinyl toluene and a filler therefor and combined with fibrous strands, e.g., glass fiber roving. Reinforcements elements 777 are shown as glass fiber strands but any tensile reinforcement of metal or fiber alone or used together and adapted to any specific structural or civil engineering design may be used. Helically wound reinforcement 28 is advantageously glass fiber and plastic resin composition. The reinforcement 777 and 28 may be an embodiment of my invention comprising the packaged cable-like constructions packed ready for use as disclosed in my application Ser. No. 267,166, filed Dec. 17, 1951, and a portion of which is now Patent No. 2,671,158.

The features of FIGURES 10–13 are combined in practice in embodiments other than those shown and no limitation is intended in making any compatible combination of construction.

Essentially, high pressure conduits designed to meet the environmental conditions of earthquake, flood, tornado and atomic blast is the product intended in the present invention. The accepted present criteria for design of such structures prior to this disclosure do not meet the indicated needs of atomic blast and never have adequately met those of natural natures forces like occurring in tornado or flood. The brittle characteristics of concrete or other porous structural useful materials of high compressive strength and low tensile strength as is concrete, is definitely modified and improved in substantial amounts of strengths by this invention. I make concrete take on new properties in flexure, tension, compression, shear and torsion, and particularly in flexure by the improvements of this invention wherein I chemically prestress prestressed preloads into concrete, by said chemical means alone, or in combination with thermal and/or mechanically induced prestressed preloads. By changing the structural material characteristics of the concrete or other porous structural material after it is precast and cured and "pre-shrunk" the very nature of concrete as a material is changed by this invention. It is a composite material having the properties of its original components and as set in combination with set plastic resin compositions that are reinforced with fibrous reinforcement, or are used alone for their own properties, or are plastic resin compositions containing selected discrete fillers. Concrete is a brittle glass like material which spalls on impacts. By this invention concrete is now a tough, rubbery, denser stronger material in which the concrete body provides in its pores the storage space for the plastic resin reinforcements in and of the body as well as the best anchorages for laminations of glass fiber or other fibrous reinforcement, and as well as conventional steel and prestressing steel reinforcement in its body or on its body or in the laminated layer above the surface of the body of the concrete by being adhered and bonded to the said porous structural body.

Join and joinery 75 is shown as a plastic resin fiber glass fiber reinforced laminated bonded bonding layer connecting and bonding two pipe elements together. The recessed surface of the exterior of the pipe element near and at the joint and the configurations of surface at this point provide anchorages for laminated multiple reinforcement which is provided advantageously in an enveloped packaged ready-for-use polymerizable constructions and in use, is wrapped around the joint between the pipe elements. At will when the pipe is placed in a trench, e.g., and is aligned, the polymerization reaction is activated by means of my invention and the joint construction is cured and set and securely bonded to make a fluid tight joint and at the same time act as a structural reinforcement in and of the joint. Combined with the pipe element surface inside and outside laminated surface construction layers the joinery thus employed working in a balanced designed construction makes greatly increased strength available and much better and more useful working surfaces of the composite construction.

In existing pipe lines the above described joinery can be advantageously used to make repairs.

The following examples show some but by no means all of the formulations and constructions illustrative of the present invention:

*Example I*

A 36" diameter syphon in a water supply system is made as follows:

Hume type centrifugal concrete pressure pipe is provided precast in lengths of 8 ft. to 12 ft. and having a 3⅛" minimum wall thickness and in its raw concrete state designed for 0 to 150 ft. heads with maximum allowable unit stress in the steel of 12,500 pounds. The exterior surface of this pipe is to be protected against adverse chemical action and I designated a ¼" thick plastic resin-fiber-glass laminated construciton for this purpose as follows.

Mix design: Parts by wt.
  Paraplex P–444 (Rohm & Haas Co.) an unsaturated polyester containing monomeric methyl methacrylate and monomeric styrene or vinyl toluene-blended 80% Paraplex P–444 with 20% styrene monomer (or vinyl toluene) _____ 100
  Benzoyl peroxide _____ 1
  Aluminum silicate powder—ASP 600 _____ 25

(This formulation will have a pot life of about 2.5 days at 77° F. and will cure at 180° F. to 250° F. in about 2.0 minutes to 2.5 minutes) environment considered.

Color may be added if desired.

The concrete pipe sections are secured in the apparatus as shown in FIGURE 9 and rotated at a speed adapted to lay the glass fiber roving on the concrete pipe body in an even layer, each roving being side by side. A sufficient amount of resin composition is layed on the pipe body by the spray guns to completely cover the pipe surface and provide enough for impregnation to a depth of 1" into the pipe body. The pipe is rotated until the ¼" cross-section is built-up, it being subjected to a hot stream of air from time to time to set up the laminate and give a final cure at a temperature of about from 180° F. to 250° F. Alternate curing heat may be provided by infra-red lamps or by ambient curing means known in the art.

*Example II*

In making predetermined amounts of prestressed preload that is induced into any given construction by the forces derived from the polymerization reaction I have found that combination of resins each having specific properties provides a sure and ready means of deriving specific amounts of internal stress. An example stressing type of plastic resin composition can be made by using polyesters based on a variety of polybasic acids and polyhydroxyl alcohols that contain free carboxyl groups and/or aliphatic hydroxyls capable of reacting with the epoxy resins. The wide range or molecular structures possible for the polyester resins together with co-curing reactions occurring when they are combined with epoxy resins provide me with resinous compositions modified to specific end uses. Polyesters of certain specific characteristics as well as polysulfides such as Thiokol rubbers are used as flexibilizers. The effect of the polyester on the epoxy resin on the combined properties is dependent on the acids and alcohols used in the synthesis and on the number of members in the resulting resin chain. If other reactive elements are added, the properties can be varied even more.

The shrinkage of epoxy resins is of a low order while that of e.g., polyester resins is of a relatively high order. Together with fillers and pigment I use the art and the knowledge of the art of resin compounding to provide specific stress characteristics.

Because of the toughness and high adhesive properties of the epoxies they provide upgrading agents for other resins like the phenolics, ureas, furanes, polyesters, melamines, vinyls, and fluoro-carbons and even asphaltic material or coal-tars. Thus the phenolic-epoxy resin compositions may be used to improve heat-distortion temperatures of specific resinous composition systems. Such lower priced synthetic resin systems I find can be used in fairly high percentages to reduce overall cost of any specific-epoxy-resin system. Various phenolic resins and intermediates known in the art react with epoxy resins and cure them in the presence of an acid or base catalyst, e.g., phosphoric acid, caustic or dicyandiamide.

Urea formaldehyde and melamine-formaldehyde resins cross-link with epoxy resins through methylol groups. Furfural resins containing methylol groups also act as modifiers for epoxy resins similar to methylol-bearing phenol and melamine resins to improve flexibility when used in the order of 25 phr., to improve chemical resistance to acids, specifically to hydrofluoric acid when used on the order of 65 phr. and also furfural resins reduce cost.

Vinyl chloride resins act as a heat stabilizer when combined with epoxy resin systems, the vinyl chloride resins losing HCl in the presence of heat. Small percentages of vinyl chloride acetate with vinyl formal resins improve peel and impact strengths.

Isocyanates as polyurethanes react with hydroxyl groups present in epoxy resins chains to provide cross-linking. The isocyanate groups will react with primary and secondary amines and are capable of co-curing not only with the epoxies but with any amine curing agent present to provide tightly cross-linked structures. Monomeric diisocyanates such as tolylene diisocyanate, diphenylmethane 4,4'-diisocyanate, and 3,3'-butolylene 4,4'-diisocyanate are commercially available as reactive cross-linking intermediates.

Fluorinated resins while being insoluble in liquid epoxy resins and do not react with them can be combined in solution compounds to make co-acting polymerizable resinous compounds which are excellent high adhesive materials having a low water transmission due to the fluorinated resins.

Silicone polymers are usually very weak and soft mechanically, but do have high thermal stability imparted by the presence of the silicon atom. When combined with epoxy resins good mechanical properties and electrical properties are provided in the combination. Modifications of silicone adhesives with 10 to 40% of epoxy resins having a degree of polymerization of 1 have resulted in a marked increase in shear strength at 500° F.

Each particular resin formulation will exhibit its own specific properties, and through the judicious selection of components, it is possible to design systems exactly suited to highly specialized end uses.

TYPICAL COMMERCIAL EPOXY RESINS

| Resin type | Color, 25° C. (Gardner) | Epoxide Equivalent | Average Molecular Weight | Viscosity at 25° C. centipoises or Gardner-Holt | Melting Point (Durans) |
|---|---|---|---|---|---|
| Bakelite Co.: | | | | | |
| ERL-2774 | [1] 10 | 185-200 | 350-400 | 10,500-19,500 | Liquid |
| ERL-3794 | [1] 5 | 170-182 | 350-400 | 7,200-19,200 | Liquid |
| ERL-2795 | [1] 9 | 194-179 | 340-400 | 500-900 | Liquid |
| ERLA-3001 epoxy/phenolic | | | | | |
| Ciba Co. Araldite 502 | | | | 1,600-1,700 | [2] 25 |
| Jones-Dabney Co. Epi-Rez-510 | 4 | 250 | | 3,000 | Liquid |
| Shell Chemical Co. Eopn Resins: | 6 | 180-200 | 350-400 | 9,000-12,000 | Liquid |
| 562 | [1] 5 | 140-165 | 300 | 150-200 | Liquid |
| 820 | [1] 8 | 175-210 | 350-400 | 4,000-10,000 | Liquid |
| 828 | [1] 12 | 175-210 | 350-400 | 5,000-15,000 | Liquid |
| 815 | [1] 8 | 175-210 | 340-400 | 500-900 | Liquid |
| 834 | [1] 10 | 225-290 | 450 | $A_2$-$A_1$ | Liquid |
| 864 | [1] 8 | 300-375 | 700 | $A_1$-B | 40-50 |
| 1001 | [1] 8 | 450-525 | 900-1,000 | C-G | 64-76 |
| 1004 | [1] 6 | 870-1,025 | 1,400 | Q-U | 95-105 |
| 1007 | [1] 8 | 1,650-2,050 | 2,900 | I-Z | 125-132 |
| 1009 | [1] 11 | 2,400-4,000 | 3,800 | $Z_1$-$Z_5$ | 145-155 |

[1] Maximum.
[2] Deg. C.

Typical of the room temperature curing agents useful in adhesive formulations are such cross-linking aliphatic amines as diethylene triamine, triethylamine, and diethylamino propylamine and catalytic amines such as tridimethyl amino methyl phenol. Strong acids, such as oxalic, are also used to give good room temperature shear strengths.

A typical room-temperature curing agent and a filler type formulation of epoxy resin composition is as follows:

| | Parts by wt. |
|---|---|
| Mixed polymer/epoxy resin containing 25 parts of a glycerol-based epoxy | 100 |
| Allyl glycidyl ether | 10 |
| Filler | 100 |
| Triethylamine | 12.5 |

A test formulation as follows was used with various fillers:

| | Parts by wt. |
|---|---|
| Mixed polymer/epoxy resin | 125 |
| Tridimethyl amino methyl phenol | 10 |

EFFECT OF FILLERS ON SHEAR STRENGTH OF ADHESIVE FORMULATION

| Fillers, at 100 phr. | Shear Strength, p.s.i. | | | |
|---|---|---|---|---|
| | Phenolic linen laminates tested at— | | | |
| | 23° C. | 75° C. | 90° C. | 105° C. |
| Aluminum Powder | 2,700 | | 1,470 | 1,390 |
| Ignited Al₂O₃ | 4,600 | 1,360 | 1,195 | 530 |
| Short-fiber asbestos | 1,740 | 1,270 | 580 | 510 |
| Carbon Black | 2,000 | 555 | 980 | 910 |
| Silica | 2,840 | 1,600 | 1,250 | 830 |
| Zinc dust | 2,510 | 600 | 300 | 225 |

The data on epoxy resins is taken from "Epoxy Resins" by Henry Lee and Kris Neville, published from McGraw-Hill Book Company and from my own notes and development data.

*Example III*

In this example I make a prestressed reinforced integrally laminated hollow cylindrical construction adapted to support substantial interior pressures and external loading and having a smooth interior surface.

One formulation I use is made as follows:

| | Parts mix by wt. |
|---|---|
| Polyester resin—Atlac 382 (dry resin) parts by wt. | 60 |
| Styrene monomer (fluid) parts by wt. | 40 |
| | 45 |
| Catalyst—Methylethyl ketone peroxide in dimethyl phthalate | 2 |
| Aluminum Silicate (ASP–400) | 30 |
| Glass fiber roving | 25 |

On a polished stainless steel mandrel having an internal heating device controllable to 5° F. plus or minus I spray spin a layer of the above resin composition to completely cover the mandrel as it is slowly spun. The resin composition is gelled as applied and into this resin layer the fiber glass rovings are spirally wound as additional resin composition is sprayed onto the mandrel until a predetermined selected quantity providing the above cross-section is applied.

During the time that I am applying the above formulation onto the mandrel, I also have a section of concrete pipe being dried of moisture and heated to about 180° F. On the dried surface I spray a layer of the above formulation of resin composition to which I add about 5% styrene monomer to get a desired penetration and spray until a desired amount of resin composition gels on the surface of the concrete. At this stage with both the concrete surface resin composition and the laminated fiber glass resin composition on the steel mandrel in a like gelled condition, I then slide the mandrel into the concrete pipe.

The heating device in the mandrel is advanced to 250° F. in this case and the entire construction bonded together as the polyester resin composition polymerizes to a cured state. The polyester resin composition in the concrete and on it having additional styrene monomer (about 5%) shrinks more than the layer on the mandrel so that the laminated layer is drawn in toward the concrete as the composite laminated construction cures to a unitary construction. On completion of the cure of the resin composition, in this case about 4 minutes, I cool the mandrel until the completed unit easily slides off from the mandrel. The resulting interior surface construction layer is very smooth and glass-like in its shiny appearance.

Various other fibrous reinforcements can be used of which the following are illustrative but not limiting:
Ferro Unifab style P970—Fiber glass cloth, finish 172 at 9.70 ounces per sq. yd.;
Ferro Unirove style 545—Fiber glass woven roving;
Ferro Uniformat—HSB–2—Fiber glass mat.

These reinforcements are in mat or fabric form and can be wrapped around the mandrel in one or more plies and are sprayed with enough resin composition to saturate the layer and with a surplus so roving when wound around the layer or in between the layers of a plurality of layers are used to insure complete impregnation and coverage of the fibrous constructions. Preimpregnated mat or bat or fabric can be likewise used. Glass fiber can be layed in place without being tensioned.

While a simple resin composition is given herewith, I use many different compositions known in the art and of my own invention and the general method here given is used with such variations as the resin compositions require in accordance with a design. By using a catalyst type gun like the Binks gun or the DeVilbiss gun I spray spin a resinous composition in two components so that a quick setting catalyst system can be used thus speeding up the operation or for getting directly specific properties to the total construction. Any adaptable resin composition known in the art thus can be spray spun into a resinous fabric or composition.

Alternatively, in place of spray spinning the glass fiber reinforcements may be pre-impregnated with a resin composition as known in the art and provided ready for use or the glass fibers may be run through an impregnating vat before placement on the concrete or on a prior layed layer of fiber reinforcement.

The following is a partial list of commercial materials I use:
Plaskon polyester resin 941—a rigid unsaturated polyester resin.
Plaskon polyester resin 9600—a flexible unsaturated polyester resin.
Plaskon polyester resin PE–13—(Self-extinguishing) chlorinated unsaturated polyester resin.

Epon resin—Formulation XA-200—Solution A:

|  | Percent by wt. |
|---|---|
| Epon 1001—for solids content below 60% by wt., thin with n-butanol-toluene,1,1. | |
| Methyl isobutyl ketone | 45 |
| Butyl Cellosolve | 5 |
| Toluene | 50 |
| | 100 |
| Epon 1001 | 97 |
| Beetle 216-8 | 3 |
| | [1] 100 |

Epon resin—Solution B:

| Ethylene diamine | 50 |
|---|---|
| n-Butanol | 17 |
| Toluene | 17 |
| Water (from technical grade amine) | 16 |
| | 100 |

[1] Beetle 216-8 is added as a leveling agent.

Solution B is added to solution A with thorough stirring just prior to use and it also can be applied through a catalyst type two headed spray gun. The ratio of solution B to solution A will depend on the solids content of Solution A, but addition should be adjusted so that 6 parts (w) of pure ethylene diamine are added to 100 parts (w) of resin solids. Improved formulations are constantly being presented and no limitation is intended in the examples given.

An unsaturated polyester resin composition is as follows:

| Polyester resin—Vibrin 117, parts by wt. | 100 |
|---|---|
| Lupersol DDM—Methylethyl ketone peroxide in dimethyl phthalate, parts by wt. | 2 |
| Cobalt Naphthanate (6%) part per 100 parts of resin by wt. | .03 |

An epoxy/polyamide resin composition is as follows:

| | Parts by wt. |
|---|---|
| Versamid 115 polyamide resin—General Mills Co. | 50 |
| Bakelite ERL 2795 epoxy resin | 50 |
| AFD filler (Aluminum Flake Co.) | 20 |

The following are examples of spraying type room-temperature epoxy resin compositions:

| Solid tough type—Epoxy resin: softening point (° C.) mercury method Durrans's | 70 |
|---|---|
| Specific gravity | 1.21 |
| Weight per gallon (lb.) | 10.1 |
| Viscosity (40% in butyl Carbitol) | E |
| Bulking value (gal./lb.) | .099 |
| Color (40% in butyl Carbitol) | 4 |
| Esterification equivalent (grams of resin esterified by 1 gram-mole of monobasic acid) | 130 |
| Epoxide equivalent (grams of resin containing 1 gram equivalent of epoxide) | 485 |
| Epoxy value (epoxide equivalents per 1000 grams of resin) | 2.05 |

A specific formulation for spraying:

| | Parts by wt. |
|---|---|
| Epoxy resin | 580 |
| Toluol | 195 |
| MIBK | 175 |
| Butyl Cellosolve | 20 |
| Dissolve and add: | |
| Beetle 216-8 (60%) | 30 |
| | 1,000 |

Before use, reduce the above with:

| | Parts by wt. |
|---|---|
| Diethylene triamine (6% on solids) | 36 |
| Xylol | 18 |
| Butanol | 18 |
| | 72 |

Then add the following solvent-blend to obtain the desired viscosity:

| Toluol | 500 |
|---|---|
| MIBK | 450 |
| Cellosolve | 50 |
| | 1,000 |

To cure bake for—
20 minutes at 200° F.
10 minutes at 250° F.
7 minutes at 300° F.
4 minutes at 350° F.
2 minutes at 400° F.
1 minute at 450° F.

Polyamide portion made as follows:

| | Parts by wt. |
|---|---|
| Versamid 115 | 600 |
| Toluol | 360 |
| Cellosolve | 40 |
| | 1,000 |

Final blend mixing:

| | Percent parts by wt. |
|---|---|
| Resin portion | 65 to 68 |
| Polyamide portion | 32 to 35 |

Make the final blend just prior to use. Thin to viscosity desired with the following solvent-blends.

An epoxy resin combined with polysulfide rubber resin is as follows:

| | Lbs. | Gal. |
|---|---|---|
| Resin Portion: | | |
| Epoxy Resin-Araldite 6010 | 260 | 26.70 |
| Araldite 6071 | 175 | 17.33 |
| MEK | 104 | 15.50 |
| Beetle 216-8 | 39.25 | 4.61 |
| Polysulfide Portion: | | |
| Thiokol LP-3 | 217 | 20.50 |
| DMP-30 | 44 | 5.36 |
| MEK | 67.10 | 10.00 |
| | 906.35 | 100.00 |

Mix resin portion and polysulfide portion very well before use.

Trade-marks "Plaskon," "Epon," "Vibrin," "Lupersol DDM," "Versamid 115," "Bakelite ERL 2795," "AFD Filler," "Beetle 216-8," "Araldite 6071," and "Thiokol LP-3" are the trade-marks for the following companies. "Plaskon" unsaturated polyester resins, a product of Allied Chemical Co.; "Epon," epoxy resins, a product of Shell Oil Co., New York 20, N.Y.; "Vibrin," unsaturated polyester resins, a product of Naugatuck Chemical Co., Naugatuck, Conn.; "Lupersol DDM," methylethyl ketone peroxide, a product of Wallace and Tiernan Co., Buffalo, New York; "Bakelite ERL 2795," an epoxy resin, a product of Union Carbide Co.; "Beetle 216-8," Urea-formaldehyde solution of 60% solids used to decrease surface tension and aid leveling properties, a product of Union Carbide Co., and others.; "AFD Filler," an aluminum filler, a product of Aluminum Flake Co., New York, N.Y.; "Araldite 6071" epoxy resin, a product of Ciba Co., Fairlawn, N.J.; "Thiokol LP-3," polysulfide rubber resin, a product of Thiokol Chemical Corp., New York, N.Y.

A variety of fillers, pigments, and dyes can be incorporated into either one or both of the component parts. Titanium dioxide, zinc sulfide, silica, carbon black, and powdered aluminum may be used. However, aluminum-type fillers should be added only to the resin portion as the amine-catalyst (DMP-30) in the polysulfide portion will react with these after prolonged contact. These mixtures will cure at room temperatures or at elevated temperatures in from 3 days at 60 to 90° F. to 3 min. at 350° F. with temperature being the direct factor of time in the cure.

The knowledge of the art of such resin compounding is constantly expanding and the examples given are for illustration and are not limiting upon the examples given as the invention here disclosed applies such art to the combination of concrete or other porous structural material as avialable for the pipe, tanks or vessels made with resin compositions, elastomeric composition and synthetic or rubbery materials.

One of the important elements is the shrinkage factor of each resin or combination of resins or discrete selected components used in the formulations containing resins since the forces developed by the shrinkage or otherwise induced into the composite pipe structure or vessel structure are put to work to prestress the constructions. Another important element is the adhesive and bonding strengths developed by the resins and other discrete components. The penetrating and permeating characteristics of resins and forces derived from manually, mechanically or capillary induced force systems are factors in the structural design of constructions. The relationship to temperatures and changes therof and particularly ambient temperatures will partly determine selection of resins used for specific constructions.

The fibers selected are subject to stress analysis and each use dictates selection based on cost, availability and strength characteristics. Fiber glass fibers at present are preferred as the highest strength economical material (300,000 to 1,000,000 or p.s.i. ultimate strength in tension) with respect to tension loading. Fiber glass fibers have other definite advantages and characteristics inherent to its nature. This does not preclude any other fiber or strand adapted to any use in this invention being used where necessary.

Concrete and other porous structural materials are depended upon almost universally. There are many aggregate sources by which the engineer can design and construct good concrete or porous structural material qualities. Volcanic derived aggregates, man made calcined materials, selected rock and sand aggregates and any other commercially practical concrete materials used. Portland cements, natural cements, and resin binders are used to make concrete and concrete-like materials in the full measure of the art.

It is understood that it is intended to cover all changes and modifications of the examples of the invention herein chosen for the purpose of illustration which do not constitute departures from the spirit and scope of the invention.

Having disclosed numerous embodiments of my invention, I claim:

1. The method of making a reinforced composite concrete pipe having substantial resistance to impact and dynamic loading, and being substantially impervious to the entrance of adverse chemicals through said concrete pipe;
    (1) provide a porous concrete pipe body having open pores and interstices connected therewith, said pores and interstices being at least in the neighborhood of the surface of said concrete pipe construction;
    (2) substantially penetrate and permeate said pores and interstices of said porous concrete pipe body, and fill and cover said surface of said concrete pipe body with a tough, rubbery resin composition and provide a surplus of said resin composition on said surface thereover;
    (3) lay and cross-lay a plurality of glass fiber strands on said surface of said concrete pipe body in said tough, rubbery resin composition;
    (4) set and cure said resin composition to its cured state whereby said reinforced concrete pipe is ready for use.

2. The method of making a reinforced concrete pipe as in claim 1, in which said tough, rubbery resin composition has shrinkage forces and capture said shrinkage forces as internal stress in the body of the porous structure of said concrete pipe body, said internal stress comprising prestressed preload in said composite concrete pipe in reinforcement thereof, said tough, rubbery resin composition being selected from the group consisting of unsaturated polyester resins, epoxy resins having a curing agent therefor, silicone resins, polyurethane resins, vinyl resins, unsaturated polyester-epoxy resins, unsaturated polyester-acrylic resins, epoxy-polyamine resins, epoxy-polyamide resins, epoxy-polysulfide resins, epoxy-coal tar resins, epoxy-vinyl chloride resins, epoxy-asphaltic resins, epoxy-phenolic resins, epoxy-fluorinated resins, epoxy-urea formaldehyde resins, epoxy-furfural resins, epoxy-isocynate-polyurethane resins, epoxy-polyethylene resins, epoxy-melamine formaldehyde resins, and epoxy-silicone resins.

3. The method of making a reinforced composite concrete pipe as in claim 1, in which in addition lay and cross-lay said glass fiber strands in helically disposed continuous unidirectional winding and pretension said strands prior to their being laid in said resin composition on said surface of said concrete pipe body.

4. The method of making a reinforced composite concrete pipe as in claim 2, in which in addition place said concrete pipe body under compressive prestressed preload prior to penetrating and permeating the pores and interstices of said concrete pipe body with said tough, rubbery resin composition and capture said induced compressive prestressed preload in said concrete pipe body when said resin composition sets and cures to its set state.

5. The method of making a reinforced composite concrete pipe as in claim 4, in which in addition provide said concrete pipe body with a plurality of grooves spaced around its circumference and in said grooves embed longitudinal fibrous tensile reinforcements.

6. The method of making a reinforced composite concrete pipe as in claim 1, in which said tough, rubbery resin composition has a filler therefor.

7. The method of making a reinforced composite concrete pipe as in claim 1, in which said tough, rubbery resin composition comprises an unsaturated polyester resin composition having a substantial shrinkage upon cure applied in between, on and about the individual fibers of said glass fiber strands.

8. The method of making a reinforced composite concrete pipe as in claim 7, in which in addition an epoxy resin composition having a curing agent therefor is used in combination with said unsaturated polyester resin composition.

9. The method of making a reinforced composite concrete pipe as in claim 1, in which in addition, provide an inside pipe liner therefor,
    provide a polished mandrel for insertion into the inside of the said concrete pipe body;
    next, apply to said mandrel a layer of mold release followed by a layer of polymerizable plastic tough, rubbery resin composition and while said resin composition is in its polymerizable condition, embed and wind on said mandrel in said resin composition a plurality of helically disposed layers of long strands of high strength tensile material in lay and cross-lay pattern to provide a selected cross-sectional amount of said tensile material;
    next, apply additional resin composition to a surplus over that needed to impregnate said long strands of high tensile material, said resin composition penetrating and permeating the porous structure of said concrete pipe body when said layers of strands are combined with said concrete pipe body;

next, heat said concrete pipe body on its inside surface and slightly expand said concrete pipe body and then insert said mandrel having thereon said impregnated strands and surplus of said resin composition into said inside of said concrete pipe body and thereby form said inside pipe liner;

next, cure said resin composition and when said pipe liner is cured, remove said mandrel making said composite concrete pipe ready for use.

10. The method of making a reinforced composite concrete pipe as in claim 2, in which in addition place said porous concrete pipe body under compressive stress;

next, with said porous concrete body under compressive stress, spray-spin a polymerizable tough, rubbery resin composition-fiber reinforced laminated layer on the inside surface of said porous concrete pipe body until a selected amount of said plastic resin-fiber laminated layer is provided on said inner surface of said concrete pipe body;

next, while spray-spinning said polymerizable plastic resin-fiber laminated layer, provide curing means for said polymerizable plastic resin composition and cure it to a set state thereby making said composite concrete pipe ready for use.

11. The method of making a reinforced composite concrete pipe as in claim 10, in which said concrete pipe body is rotated at a selected speed whereby said fiber of said construction is deposited by gravity in a position above an initial application of said resin composition and in between the surface of the concrete pipe body and the exterior face of said plastic resin composition, said fiber having a specific gravity greater than the initial application of plastic resin composition, said initial application of plastic resin composition being cured by means, for example, heat, so that it retains said fiber in its body and above said concrete surface of said concrete pipe body.

12. The method of making a reinforced composite concrete pipe as in claim 11, in which said initial application of resin composition contains a filler provided to at least increase the specific gravity of said composition equal to said fiber.

13. The method of making a prestressed integrally laminated hollow cylindrical construction comprising the steps of:
  (1) provide at least one preformed cylindrical hollow body of porous structural material;
  (2) apply to the inside surface of said body a mass of polymerizable plastic resin composition and a filler therefor having a selected amount of shrinkage when set, said composition having a predetermined selected viscosity;
  (3) place said cylindrical body on a spinning apparatus and spin said body at a selected speed and provide centrifugal forces of selected magnitudes, spinning said body with said mass of polymerizable plastic resin composition and filler therefor to evenly spread said polymerizable plastic resin composition and filler therefor to a compact surface layer construction on said inside surface of said body to force integrating portions of said polymerizable plastic resin composition into the surface of said body and penetrate said surface and permeate the porous structural material adjacent said surface, said integrating portions forming anchoring resin bodies in said porous structural material and said pores thereof;
  (4) cure said polymerizable plastic resin composition to a set plastic resin composition whereby said shrinkage forces of said polymerizable plastic resin composition provide prestressed preload to said internally bonded and laminated hollow cylindrical construction;
  (5) on completion of cure of said polymerizable plastic resin composition remove said prestressed integrally laminated hollow cylindrical construction from spinning apparatus ready-for-use.

14. The method of making a prestressed integrally laminated hollow cylindrical construction as in claim 13, in which the magnitude of the centrifugal forces applied by the said spinning step are varied during the cycle of spinning to dispose a portion of said polymerizable resin composition into and on said porous structural material of said cylindrical construction, and dispose said filler in said resin composition on said surface of said porous structural material, and dispose the remainder of said polymerizable resin composition to form a smooth surface thereover whereby the said filler forms a high strength tensile reinforcement securely anchored into and on and with said porous structural material of said hollow cylindrical construction.

15. The method of making a composite concrete pipe body adapted to support substantial interior pressures and external loading comprising the steps of:
  (1) provide a substantially dried, precast and cured concrete pipe body having open pores and interstices connected therewith, said pores and interstices being at least in the neighborhood of the surface of said concrete pipe construction;
  (2) apply to the exterior surface of said composite concrete pipe body an initial layer of polymerizable polymeric resin composition for penetrating and permeating said resin composition particularly into said pores and interstices of said concrete pipe body to fill the same, said polymerizable polymeric resin composition having selected shrinkage forces which provide internal stress in compression and provide thereby prestressed preload induced into said concrete material of said concrete pipe body, said polymerizable polymeric resin composition having a surplus of resin composition on the said exterior surface of said concrete pipe body;
  (3) apply a plurality of unidirectional strands of high tensile strength fibers spaced substantially equidistant from each other on said surface of said concrete pipe body under tension to provide compressive forces against said surplus of said polymerizable polymeric resin composition, said compressive forces causing a portion of said polymerizable polymeric resin composition to penetrate and permeate into the said concrete pipe body and fill said pores and interstices connected therewith;
  (4) apply additional polymerizable polymeric resin composition and embed said strands of said fibers in said polymerizable polymeric resin composition so that all of said fibers are substantially covered;
  (5) initiate and activate said polymerizable reaction by the resin composition by heat and cure the said resin composition in the pores and interstices of said concrete pipe body and on its surface and about its high strength unidirectional fiber strands in said resin composition whereby said resin composition during its polymerization and cure provides said shrinkage forces, which forces are captured in place as said prestressed preload by said resin composition in its cured and set state and thereby bonds and integrates the said concrete pipe body, the said unidirectional high strength fiber strands and the said resin composition into said composite concrete pipe body.

16. The method of making a prestressed reinforced composite concrete pipe comprising the steps of:
  (1) provide a substantially dried precast cured concrete pipe body having open pores and interstices connected therewith extending from the inside to the outside of said concrete pipe body, and said inside surface of said concrete pipe body being circular and planar, said exterior surface of said concrete pipe body having in the pipe wall a series of grooves extending longitudinally of said concrete pipe body;

(2) place said dried precast cured porous concrete pipe body into a prestressing harness and induce and hold compressive prestressed preload into said concrete pipe body by mechanical means;

(3) apply a layer of flowable impregnating polymerizable polymeric resin composition to said inside surface of said pipe body and evenly distribute and smooth said polymeric resin composition and penetrate and permeate it into the open pores and interstices connected therewith of said wall of said concrete pipe body;

(4) next place a glass fiber material on said polymerizable polymeric resin composition on said inside surface of said pipe body and substantially completely embed said glass fiber material in said polymerizable polymeric resin composition and with a surplus thereover, said surplus having a mineral filler therefor;

(5) partially gel said polymerizable polymeric resin composition against flow;

(6) place sized longitudinal cables comprised of pluralities of unidirectional glass fiber roving strands into said longitudinal grooves on the external face of said concrete pipe body and secure said longitudinal cables of said glass fiber roving strands under tension to said external face of said concrete pipe body in said grooves by applying adhesive polymerizable polymeric resin composition, and cover, penetrate and permeate said adhesive polymerizable polymeric resin composition into said pores and interstices connected therewith of said external face of said concrete pipe body and into engagement into the pipe body with said first applied polymerizable polymeric resin composition previously penetrated and permeated from the inside surface of said wall of said concrete pipe body and gel same against flow;

(7) apply polymerizable polymeric resin composition covered continuous unidirectional fiber glass fiber roving strands under tension in helically disposed winding and cover said grooves and said embedded longitudinal cables of said glass fiber roving strands in said grooves and cover substantially completely said external surface of said concrete pipe body;

(8) apply additional polymerizable polymeric resin composition having a mineral filler therefor to the exposed surface remaining on the external face of said concrete pipe body;

(9) polymerize and cure said resin compositions to a final state of cure;

(10) when said resin compositions are cured, release said prestressing harness and remove said finished prestressed reinforced concrete pipe ready for use.

17. The method of making a prestressed reinforced concrete pipe construction having substantial impact resistance to dynamic loading and being substantially impervious with high shielding properties providing protection against dynamic loading and resistance to the entrance of adverse chemicals into said pipe construction comprising the steps of:

(1) provide at least one precast porous reinforced concrete pipe body and place said concrete pipe body in a rotatable prestressing harness and mechanically induce and hold a predetermined selected prestressed preload into said concrete pipe body;

(2) heat and dry said concrete pipe body to substantially provide maximum commercially obtained aridity in said concrete pipe body to provide open pores and interstices connected therewith available for impregnation with a flowable tough, rubbery polymerizable polymeric resin composition;

(3) while said concrete pipe body is at a temperature above ambient temperature but lower than curing temperature of said polymeric resin composition, rotate said pipe body in said rotatable prestressing harness and substantially fill said open pores and interstices connected therewith with polymerizable polymeric resin composition onto and into said inside surface of said concrete pipe body and provide a surplus of said polymerizable polymeric resin composition thereover;

(4) next partially gel said polymerizable polymeric resin composition against flow;

(5) continue to rotate said concrete pipe body at a rate of rotation holding said polymerizable polymeric resin composition in place as placed and while said rotation is in progress, apply a layer of glass fibers to said inside surface of said concrete pipe body and utilize the centrifugal force of rotation to firmly embed said glass fibers in said polymerizable polymeric resin composition and spray spin additional resin composition having a filler therefor to substantially completely cover said glass fibers as embedded making a smooth surface thereover;

(6) next gel said resin composition against flow;

(7) turning now to the outside surface of said concrete pipe body, next apply a layer of flowable, tough rubbery structural reinforcing polymerizable polymeric resin composition having a filler therefor having shielding properties on said outside surface of said concrete pipe body and penetrate and permeate said flowable resin composition into said pores and interstices connected therewith substantially in depth throughout said porous structure of said concrete pipe body;

(8) while said flowable resin composition advances to a gel state as curing proceeds, apply a plurality of glass fiber roving strands in predetermined selected directional placement under tension and substantially completely cover and embed said glass fiber roving strands while in said state of tension and form a layer of structural reinforcement and impervious characteristic with said resin composition having "fingers" and projections thereof extending into deep engagement with the porous structure of said concrete pipe body and at least partially engaging said polymeric resin composition first applied onto and into said inside surface of said concrete pipe body;

(9) while said polymeric resin composition is still in its uncured state, apply an additional layer of polymerizable polymeric resin composition having a lead powder filler and substantially cover said outside surface of said previously applied glass fiber roving strands and their embedded polymeric resin composition and build up a designed thickness layer of lead filler in said polymerizable polymeric resin composition;

(10) while applying said lead powder filler in said polymerizable polymeric resin composition, apply heat to said inside and outside surfaces of said concrete pipe body as covered and gel and cure said resin compositions against flow until said resin compositions reach their cured state and integrated structure;

(11) allow said now completed prestressed reinforced concrete pipe construction to cool to ambient temperature and at this temperature release said prestressing harness from its compressive loading and holding of said concrete pipe body and remove said prestressed reinforced concrete pipe body construction ready-for-use.

18. The method of making a prestressed reinforced composite concrete pipe as in claim 17 in which said polymerizable polymeric resin composition is selected from the group consisting of unsaturated polyester resins, epoxy resins having a curing agent therefor and polyurethane resins.

19. The method of making a prestressed reinforced composite concrete pipe as in claim 17 in which said polymerizable polymeric resin composition includes as a component therefor a thermoplastic resin composition.

20. The method of making a prestressed reinforced composite concrete pipe as in claim 17 in which said polymerizable polymeric resin composition is thermosetting and as a component thereof includes an elastomeric resin composition providing elasticity to the structure.

21. The method of making a prestressed reinforced composite concrete pipe as in claim 17 in which said glass fiber includes as a component of said reinforcement a reinforcement selected from the group consisting of aluminum silicate fibers, fuzed quartz fibers, spun ceramic fibers, asbestos fibers, and metal wires.

22. The method of making a prestressed reinforced composite concrete pipe as in claim 17 in which said polymerizable polymeric resin composition includes as a filler thereof a filler selected from the group consisting of silica minerals, aluminum silicate minerals, short-fibered asbestos, ignited aluminum trioxide, titanium dioxide, calcium carbonate, sand and lead powder.

23. The method of making a prestressed reinforced composite concrete pipe as in claim 17 in which said glass fiber unidirectional roving strands are used in combination with organic fibers selected from the group consisting of sisal fibers, hemp fibers, and cotton fibers.

24. The method of making a prestressed reinforced composite concrete pipe as in claim 17 in which said glass fiber unidirectional roving strands are used in combination with synthetic fibers selected from the group consisting of nylon fibers, rayon fibers, polyethylene terephthalate fibers, acrylic fibers, and metal wires.

25. The method of making a prestressed reinforced composite concrete pipe as in claim 17 in which said glass fiber unidirectional roving strands are used in combination with fiber glass fiber multidirectional glass fiber mat, woven glass fiber roving, loosely applied fibers of glass and glass fiber cloth as selected for specific constructions.

References Cited

UNITED STATES PATENTS

| Patent No. | Date | Name | Class |
|---|---|---|---|
| 1,636,367 | 7/1927 | Illemann | 264—270 X |
| 2,011,463 | 8/1935 | Vianini | 138—176 |
| 2,120,309 | 6/1938 | Carson | 264—270 X |
| 2,236,107 | 3/1941 | Miller et al. | 138—176 |
| 2,248,098 | 7/1941 | Connelius et al. | 264—270 X |
| 2,255,313 | 9/1941 | Ellis | 260—17.4 |
| 2,275,272 | 3/1942 | Scripture | 117—123 |
| 2,425,883 | 8/1947 | Jackson. | |
| 2,696,353 | 12/1954 | Vessels | 156—172 X |
| 2,706,498 | 4/1955 | Upson | 138—176 X |
| 2,817,619 | 12/1957 | Bickel et al. | 264—265 |
| 2,921,463 | 1/1960 | Goldfein | 264—228 X |
| 2,962,052 | 11/1960 | Sargovic | 117—94 X |
| 3,002,534 | 10/1961 | Noland et al. | 156—161 X |

EARL M. BERGERT, *Primary Examiner.*

P. DIER, *Assistant Examiner.*